(12) United States Patent
Kwant et al.

(10) Patent No.: US 11,295,519 B2
(45) Date of Patent: Apr. 5, 2022

(54) METHOD FOR DETERMINING POLYGONS THAT OVERLAP WITH A CANDIDATE POLYGON OR POINT

(71) Applicant: HERE Global B.V., Eindhoven (NL)

(72) Inventors: Richard Kwant, Oakland, CA (US); Anish Mittal, Berkeley, CA (US); David Lawlor, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/522,337

(22) Filed: Jul. 25, 2019

(65) Prior Publication Data

US 2019/0347851 A1    Nov. 14, 2019

Related U.S. Application Data

(62) Division of application No. 15/353,447, filed on Nov. 16, 2016, now Pat. No. 10,445,927.

(51) Int. Cl.
*G06T 17/05* (2011.01)
*G06T 17/20* (2006.01)

(52) U.S. Cl.
CPC ............. *G06T 17/05* (2013.01); *G06T 17/20* (2013.01); *G06T 2210/12* (2013.01); *G06T 2210/21* (2013.01)

(58) Field of Classification Search
None
See application file for complete search history.

(56) References Cited

U.S. PATENT DOCUMENTS 5,506,897 A * 4/1996 Moore ................ H04Q 3/0029
                                                        379/220.01
6,172,682 B1    1/2001 Claiborne et al.
(Continued)

FOREIGN PATENT DOCUMENTS

WO    2015079201 A1    6/2015

OTHER PUBLICATIONS

Guo et al., "A MapReduce Algorithm for Polygon Retrieval in Geospatial Analysis", CLOUD '15 Proceedings of the 2015 IEEE 8th International Conference on Cloud Computing, Jun. 27-Jul. 2, 2015, 8 pages.

(Continued)

*Primary Examiner* — Yanna Wu
(74) *Attorney, Agent, or Firm* — Ditthavong, Steiner & Mlotkowski

(57) ABSTRACT

An approach is provided for determining a polygon of a geographic database that overlaps a candidate polygon or candidate point. The geographic database represents stored polygons as respective polygon points with zero area. The approach involves determining proximate polygon points from among the respective polygon points with zero area that are within a distance threshold of the candidate polygon or the candidate point. The approach also involves retrieving one or more proximate polygons from the geographic database that correspond to the one or more proximate polygon points. The approach further involves determining an intersection between the one or more proximate polygons and the candidate polygon or the candidate point. The approach then involves selecting the polygon that overlaps the candidate polygon or the candidate point based on the determined intersection.

19 Claims, 11 Drawing Sheets

(56) References Cited

U.S. PATENT DOCUMENTS

| | | |
|---|---|---|
| 7,505,048 B2 | 3/2009 | Su |
| 8,046,168 B2 | 10/2011 | Wang et al. |
| 8,930,245 B2 | 1/2015 | Streich |
| 2006/0069504 A1 | 3/2006 | Bradley et al. |
| 2013/0345969 A1 | 12/2013 | Udeshi et al. |
| 2016/0085773 A1* | 3/2016 | Chang .................. G06F 16/58 715/753 |
| 2016/0217519 A1 | 7/2016 | Kozat et al. |
| 2017/0048664 A1 | 2/2017 | Zhang et al. |
| 2017/0070513 A1 | 3/2017 | Robertson et al. |

OTHER PUBLICATIONS

GeeksforGeeks, "How to check if a given point lies inside or outside a polygon?", retrieved on Nov. 16, 2016 from http://www.geeksforgeeks.org/how-to-check-if-a-given-point-lies-inside-a-polygon/, 8 pages.
Universite de Montreal, "The Algorithm", retrieved on Nov. 16, 2016 from http://www.iro.umontreal.ca/~plante/compGeom/algorithm.html, 5 pages.

* cited by examiner

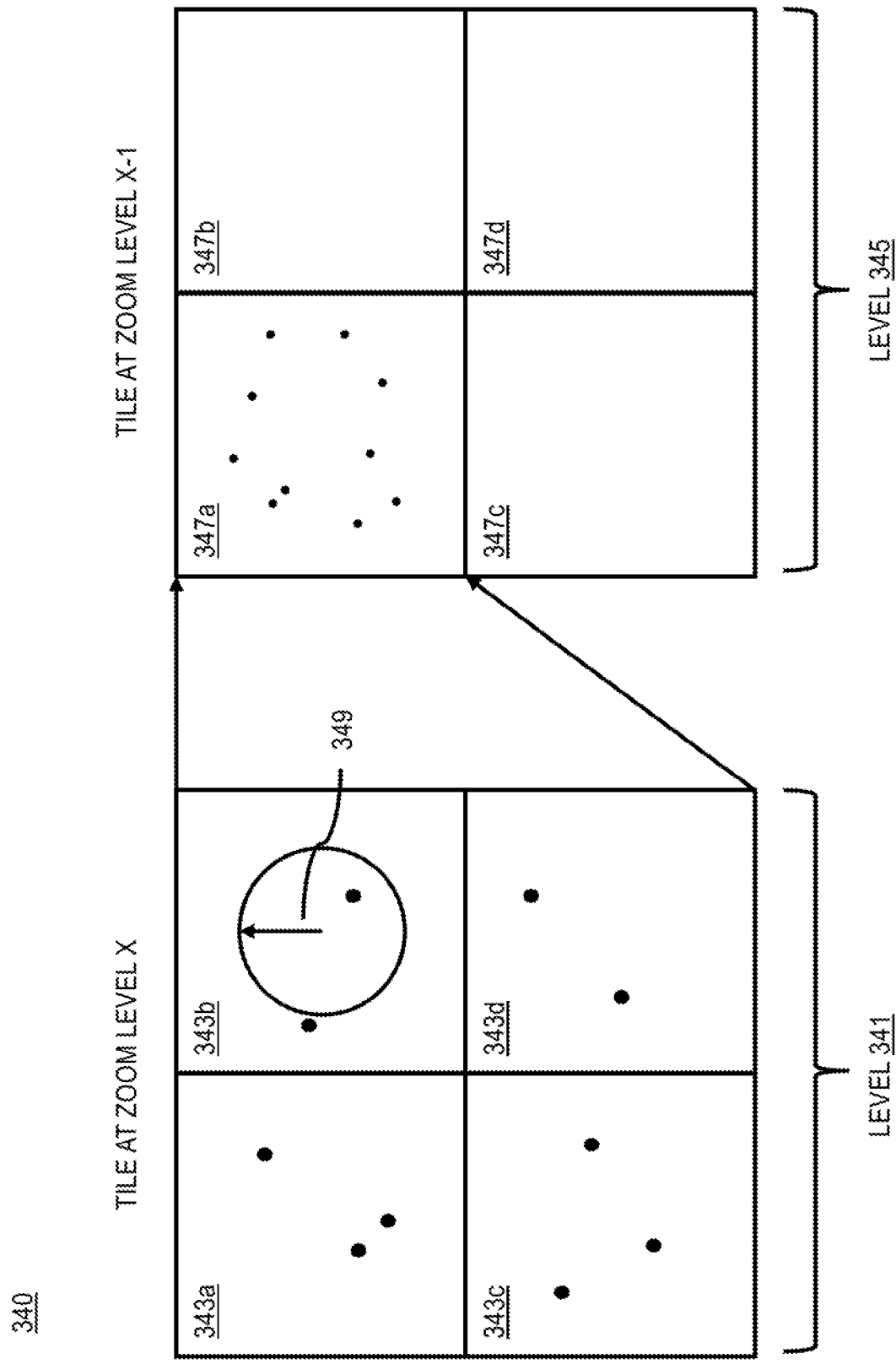

METHOD FOR DETERMINING POLYGONS THAT OVERLAP WITH A CANDIDATE POLYGON OR POINT

RELATED APPLICATIONS

This application is a divisional of U.S. patent application Ser. No. 15/353,447, filed on Nov. 16, 2016, entitled "Method for Determining Polygons that Overlap with a Candidate Polygon or Point," the entirety of which is incorporated herein by reference.

BACKGROUND

Navigation and mapping service providers often use polygons to represent geographic features (e.g., natural features such as lakes, parks, etc.; as well as man-made features such as buildings or other structures) in a geographic database. One common function is finding overlaps between stored polygons and a candidate polygon or candidate point. For example, service providers can use the process of finding overlapping polygons to support many location-based services such as point-of-interest (POI) recommendations, advertising intelligence, database collation or update, etc. However, historical approaches to finding polygon overlaps are often resource intensive and time consuming because they rely on evaluating a large number of stored polygons. Accordingly, service providers face significant technical challenges to enabling an efficient and fast search for overlapping polygons in a geographic database.

SOME EXAMPLE EMBODIMENTS

Therefore, there is a need for an approach for determining polygons that overlap with a candidate polygon or candidate point that, for instance, minimizes use of computational resources and time.

According to one embodiment, a method for determining a polygon of a geographic database that overlaps a candidate polygon or a candidate point, wherein the geographic database represents stored polygons as respective polygon points with zero area, comprises determining one or more proximate polygon points from among the respective polygon points with zero area of the geographic database that are within a distance threshold of the candidate polygon or the candidate point. The method also comprises retrieving one or more proximate polygons from the geographic database that correspond to the one or more proximate polygon points. The method further comprises determining an intersection between the one or more proximate polygons and the candidate polygon or the candidate point. The method further comprises selecting the polygon that overlaps the candidate polygon or the candidate point based on the determined intersection.

According to another embodiment, an apparatus for determining a polygon of a geographic database that overlaps a candidate polygon or a candidate point, wherein the geographic database represents stored polygons as respective polygon points with zero area, comprises at least one processor, and at least one memory including computer program code for one or more computer programs, the at least one memory and the computer program code configured to, with the at least one processor, cause, at least in part, the apparatus to determine one or more proximate polygon points from among the respective polygon points with zero area of the geographic database that are within a distance threshold of the candidate polygon or the candidate point. The apparatus is also caused to retrieve one or more proximate polygons from the geographic database that correspond to the one or more proximate polygon points. The apparatus is further caused to determine an intersection between the one or more proximate polygons and the candidate polygon or the candidate point. The apparatus is further caused to select the polygon that overlaps the candidate polygon or the candidate point based on the determined intersection.

According to another embodiment, a non-transitory computer-readable storage medium, for determining a polygon of a geographic database that overlaps a candidate polygon or a candidate point, wherein the geographic database represents stored polygons as respective polygon points with zero area, carries one or more sequences of one or more instructions which, when executed by one or more processors, cause, at least in part, an apparatus to determine one or more proximate polygon points from among the respective polygon points with zero area of the geographic database that are within a distance threshold of the candidate polygon or the candidate point. The apparatus is also caused to retrieve one or more proximate polygons from the geographic database that correspond to the one or more proximate polygon points. The apparatus is further caused to determine an intersection between the one or more proximate polygons and the candidate polygon or the candidate point. The apparatus is further caused to select the polygon that overlaps the candidate polygon or the candidate point based on the determined intersection.

According to another embodiment, a method for determining a polygon of a geographic database that overlaps a candidate polygon or a candidate point comprises selecting a respective point of each polygon stored in the geographic database, wherein the respective point is a zero area of said each polygon. The method also comprises creating a spatial index of said each polygon using the respective point. The method further comprises storing the spatial index in the geographic database. In one embodiment, the spatial index is searched to determine one or more proximate points from among the indexed respective points that are within a distance threshold of the candidate polygon or the candidate point, and one or more proximate polygons corresponding to the one or more proximate points are retrieved from the geographic database to determine the polygon that overlaps the candidate polygon or the candidate point.

According to another embodiment, an apparatus for determining a polygon of a geographic database that overlaps a candidate polygon or a candidate point comprises at least one processor, and at least one memory including computer program code for one or more computer programs, the at least one memory and the computer program code configured to, with the at least one processor, cause, at least in part, the apparatus to select a respective point of each polygon stored in the geographic database. The respective point is a zero area of said each polygon. The apparatus is also caused to create a spatial index of said each polygon using the respective point. The apparatus is further caused to store the spatial index in the geographic database. In one embodiment, the spatial index is searched to determine one or more proximate points from among the indexed respective points that are within a distance threshold of the candidate polygon or the candidate point, and one or more proximate polygons corresponding to the one or more proximate points are retrieved from the geographic database to determine the polygon that overlaps the candidate polygon or the candidate point.

According to another embodiment, a non-transitory computer-readable storage medium for determining a polygon of a geographic database that overlaps a candidate polygon or a candidate point, carries one or more sequences of one or more instructions which, when executed by one or more processors, cause, at least in part, an apparatus to select a respective point of each polygon stored in the geographic database. The respective point is a zero area of said each polygon. The apparatus is also caused to create a spatial index of said each polygon using the respective point. The apparatus is further caused to store the spatial index in the geographic database. In one embodiment, the spatial index is searched to determine one or more proximate points from among the indexed respective points that are within a distance threshold of the candidate polygon or the candidate point, and one or more proximate polygons corresponding to the one or more proximate points are retrieved from the geographic database to determine the polygon that overlaps the candidate polygon or the candidate point.

According to another embodiment, a method for determining a polygon of a geographic database that overlaps a candidate polygon, wherein the geographic database represents stored polygons as respective polygon points with zero area, comprising processing location data to determine a candidate polygon. The candidate polygon represents a geographic area, and the location data is determined from a location sensor of a device. The method also comprises selecting a candidate point of the candidate polygon. The method further comprises querying the geographic database for one or more proximate points from among the respective polygon points with zero area that are within a distance threshold of the candidate point. The method further comprises retrieving one or more proximate polygons from the geographic database that correspond to the one or more proximate polygon points. The method further comprises determining an intersection between the one or more proximate polygons and the candidate polygon or the candidate point. The method further comprises selecting the polygon that overlaps the candidate polygon based on the determined intersection.

According to another embodiment, an apparatus for determining a polygon of a geographic database that overlaps a candidate polygon, wherein the geographic database represents stored polygons as respective polygon points with zero area, comprises at least one processor, and at least one memory including computer program code for one or more computer programs, the at least one memory and the computer program code configured to, with the at least one processor, cause, at least in part, the apparatus to process location data to determine a candidate polygon. The candidate polygon represents a geographic area, and the location data is determined from a location sensor of a device. The apparatus is also caused to select a candidate point of the candidate polygon. The apparatus is further caused to query the geographic database for one or more proximate points from among the respective polygon points with zero area that are within a distance threshold of the candidate point. The apparatus is further caused to retrieve one or more proximate polygons from the geographic database that correspond to the one or more proximate polygon points. The apparatus is further caused to determine an intersection between the one or more proximate polygons and the candidate polygon or the candidate point. The apparatus is further caused to select the polygon that overlaps the candidate polygon based on the determined intersection.

According to another embodiment, a non-transitory computer-readable storage medium for determining a polygon of a geographic database that overlaps a candidate polygon, wherein the geographic database represents stored polygons as respective polygon points with zero area, carries one or more sequences of one or more instructions which, when executed by one or more processors, cause, at least in part, an apparatus to process location data to determine a candidate polygon. The candidate polygon represents a geographic area, and the location data is determined from a location sensor of a device. The apparatus is also caused to select a candidate point of the candidate polygon. The apparatus is further caused to query the geographic database for one or more proximate points from among the respective polygon points with zero area that are within a distance threshold of the candidate point. The apparatus is further caused to retrieve one or more proximate polygons from the geographic database that correspond to the one or more proximate polygon points. The apparatus is further caused to determine an intersection between the one or more proximate polygons and the candidate polygon or the candidate point. The apparatus is further caused to select the polygon that overlaps the candidate polygon based on the determined intersection.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3C is a diagram of a quad-tree representation of a spatial index of polygon points, according to one embodiment;

DESCRIPTION OF SOME EMBODIMENTS

Examples of a method, apparatus, and computer program for determining polygons that overlap with a candidate polygon or point are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
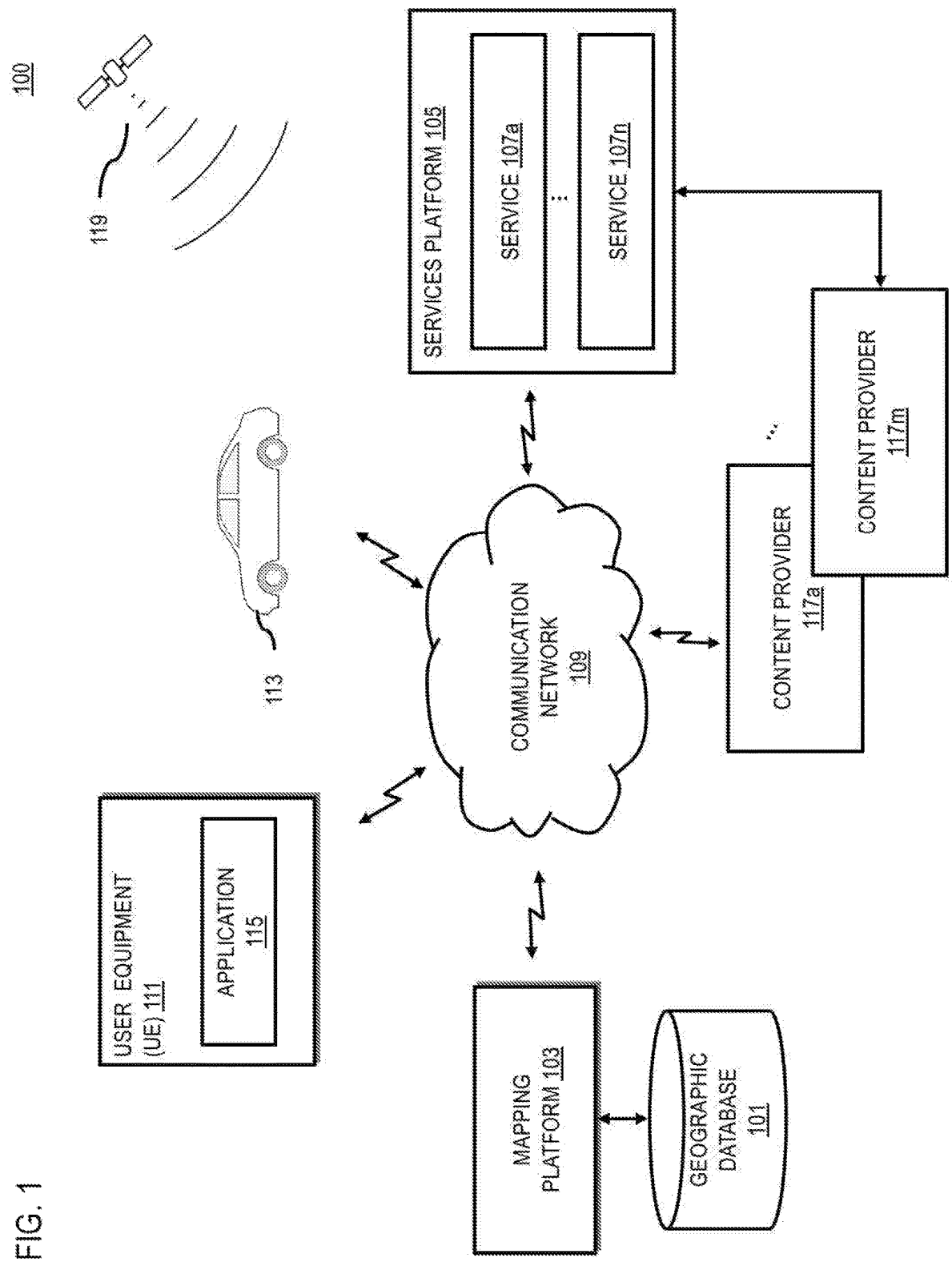
FIG. 1 is a diagram of a system capable of determining polygons that overlap with a candidate polygon or point, according to one embodiment.

FIG. 1 is a diagram of a system capable of determining polygons that overlap with a candidate polygon or point, according to one embodiment. As discussed above, service providers historically have stored geographic features of a mapped area as polygons in a geographic database. At the same time, the number of geographic features (e.g., particularly buildings) that are mapped and stored has been greatly increasing. For example, through advanced techniques such as aerial/satellite photogrammetry, mobile LiDAR, and/or similar technologies, service providers have been able to quickly map large areas (e.g., an entire city or sections of a city) at one time to extract buildings and other features as polygons (e.g., both two-dimensional and three-dimensional polygons or polygon extrusions). As a result, finding stored polygons (e.g., building polygons) that overlap with a candidate polygon or point using traditional methods can be time and resource intensive (e.g., computing resources, bandwidth for exchanging related data, etc.). For example, one polygon overlaps another polygon if one polygon: (1) is contained entirely within another polygon, (2) is substantially the same polygon (e.g., a polygon sharing the same shape or whose shape matches is within a configured accuracy threshold), (3) intersects at least a portion of another polygon, and/or (4) shares an edge or node with another polygon.

By way of example, one traditional process for determining whether a candidate point lies inside or outside a polygon involves: (1) drawing a line (e.g., a horizontal line) to the right (or left) of the candidate point and extending the line to infinity (or furthest extent of the mapped geographical area); (2) counting the number of times the line intersects with polygon edges; and (3) determining that the candidate point is inside a polygon if either the number/count of intersections is odd or the candidate point lies on an edge of the polygon—if none of the conditions is true, then the candidate point lies outside the polygon. Another traditional process for determining whether a candidate polygon overlaps with another polygon assumes that the polygons are convex and involves: (1) constructing a convex hull of a union of the candidate polygon and the another polygon; (2) for each pocket lid of the convex hull, finding the intersection of the polygons that lies within the pocket (e.g., defined with respect to the pocket lids); and (3) merging together the polygonal chains between the intersection points found in the previous step. In either case, both of these processes are computationally intensive (e.g., require significant computing resources) because a large number of stored polygons are analyzed to determine the overlap. For example, in the first process, the drawn line can extend through any number of stored polygons as long as the polygons fall along the line; and in the second process, the candidate polygon is compared against all other stored polygons to determine potential intersections. Because the number of polygons to evaluate is open-ended (e.g., up to the full extent of the geographic database), the traditional processes described above are computationally intensive and do not facilitate scaling under conditions with large numbers of candidate points/polygons and large numbers of stored polygons (e.g., building or geographic feature polygons) against which to compare or process.

To address this problem, a system 100 of FIG. 1 introduces a two-stage process to find polygons that overlap or intersect with a set of candidate polygons or points. In the first stage, the system 100, for instance, stores all polygons in a geographic database 101 along with a polygon point representation of each stored polygon. In one embodiment, each polygon point is a representative point with zero area selected for each polygon. In one embodiment, the polygon point is selected as the calculated centroid (e.g., the geometric center of the polygon calculated as the mean point of all the points in all the coordinate directions of the polygon).

However, it is contemplated that the any other process can be used to select the polygon point (e.g., based on features of the underlying geographic feature or building, such as a point corresponding to an entrance or lobby of a building, or corresponding to a most visited point within a park or other feature).

In one embodiment, the system 100 then finds or queries the geographic database 101 for proximate polygon points within a certain distance threshold (e.g., a distance radius) of a candidate point or candidate polygon. When comparing a candidate polygon (as opposed to comparing a candidate point), the system 100 can select or calculate a representative candidate point for the candidate polygon (e.g., a centroid of the candidate polygon) from which to apply the distance threshold. The system 100 then retrieves the proximate polygons from the geographic database 101 that correspond to the proximate polygon points that are within the distance threshold. After filtering to the proximate polygons, the system 100 has advantageously reduced the number polygons to process to determine the overlap from the total number of polygons stored in the geographic database 101 to just the proximate polygons (e.g., typically on the order of 1-10 polygons depending on the distance threshold applied). In one embodiment, the system 100 can then apply any process known in the art to find the overlapping/containment polygons from among just the proximate polygons (e.g., the two traditional processes described above). In other words, it is computationally simpler and less resource intensive to calculate the closeness of points (e.g., between a candidate point and a set of polygon points) than finding overlapping polygons for all polygons. For example, the system 100 expends computer resources and time only to determine which polygon points are within a threshold distance, and then to process only the proximate polygons for overlap, instead of having to process all or a large number of the stored polygons under traditional approaches. This, in turn, results in technical benefits (e.g., reduced computer resource and time requirements) over traditional approaches.

Figure 2:
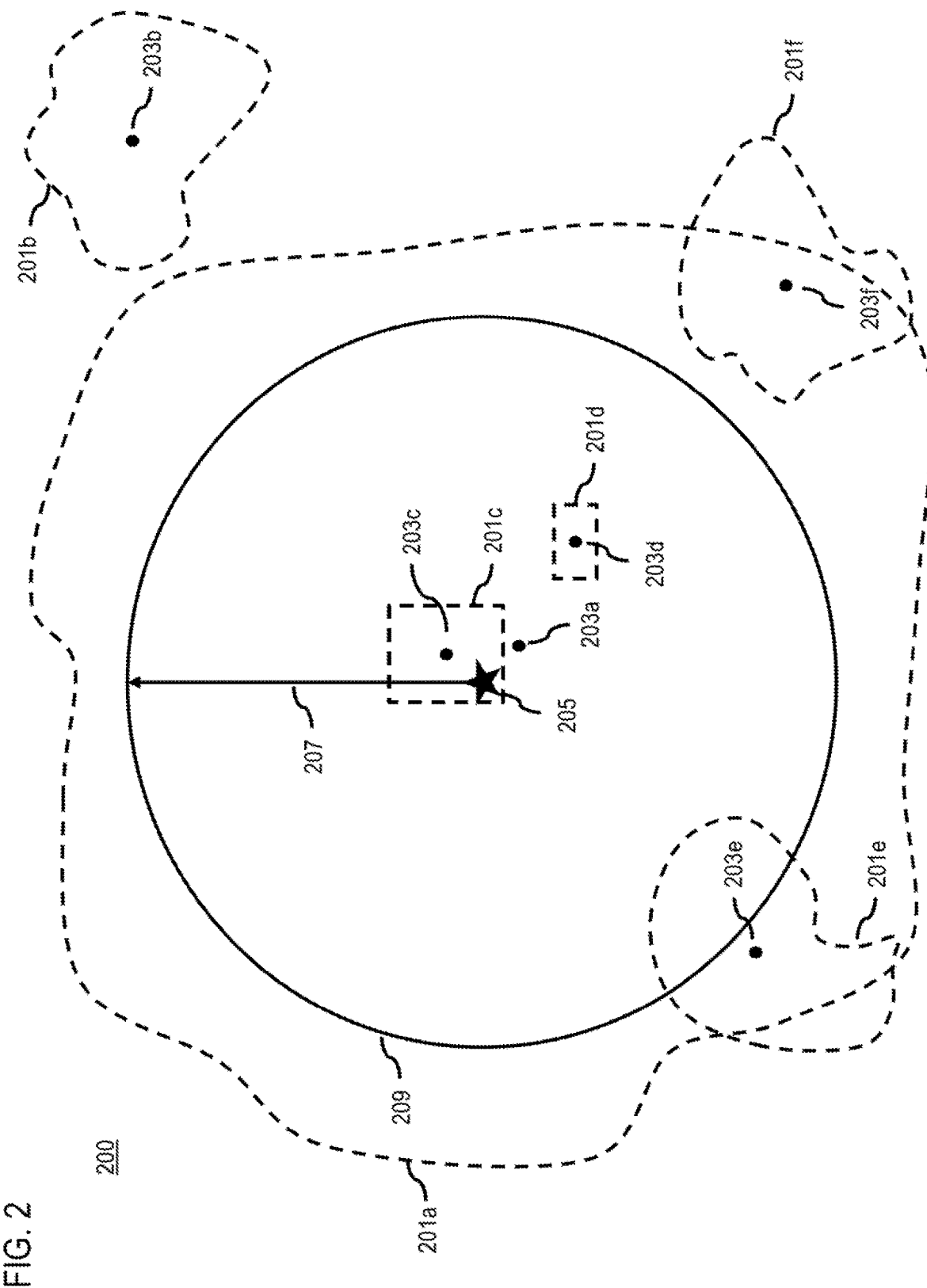
FIG. 2 is a diagram illustrating an example process for finding overlapping polygons, according to one embodiment.

FIG. 2 is a diagram illustrating an example of finding overlapping polygons as described above, according to one embodiment. In the example of FIG. 2, a geographic area 200 includes a variety of geographic features 201a-201f (also collectively referred to as geographic features 201) which are represented as polygons stored the geographic database 101. In one embodiment, the geographic database 101 also stores respective polygon points 203a-203f (also collectively referred to as polygon points 203) for each of the polygons representing the geographic features 201a-201f. In this example, the polygon points 203 are points with zero area that are the calculated centroids of each of the polygons representing the geographic features 201. By way of example, the geographic features 201 can represent: (1) natural features such as lakes, parks, etc. (e.g., geographic features 201b, 201e, and 201f which represent parks within the geographic area 200); (2) manmade features such as buildings, structures, etc. (e.g., geographic features 201c and 201d which represent buildings within); (3) political boundaries such as neighborhood boundaries, city boundaries, city boundaries, state or provincial boundaries, regional boundaries, national boundaries, etc. (e.g., geographic feature 201a which represents a neighborhood within the geographic area 200); and/or (4) any other geographic feature that can be represented in the geographic database 101.

FIG. 2 further illustrates a candidate point 205 (e.g., indicated by a star symbol) that represents a location for which overlapping polygons are to be determined. For example, for a point-of-interest (POI) recommendation service, the candidate point 205 may represent a location of a user that is requesting POI recommendations. In one embodiment, as described above, the system 100 implements a two-stage process to determine potential overlapping polygons with respect to the candidate point 205. For example, the system 100 queries the geographic database 101 for polygon points 203 that are within a specified distance threshold 207 of the candidate point. In one embodiment, the distance threshold 207 is specified as a distance radius (e.g., 5 km) from the candidate point 205, which describes a circular search area 209.

In one embodiment, points falling within the search area 209 are identified as proximate polygon points. In this example, polygon points 203a, 203c, and 203d are returned as proximate polygon points that are within the distance threshold 207 of the candidate point 205. In this example, the system 100 applies the distance threshold 207 directly to the polygon points 203 without consideration of the geometry of the corresponding geographic features 201. For example, polygon point 203a is the centroid of a polygon representing geographic feature 201a whose actual boundaries are completely outside of the search area 209. Nonetheless, because the polygon point 203a is within the distance threshold 207, the polygon point 203a is returned as a proximate polygon point. Another example of this point-based application of the distance threshold 207 can be seen with respect to geographic feature 201e. In this example, the polygon point 203e representing the polygon of geographic feature 201e falls outside of the distance threshold 207 and is not returned as a proximate polygon point. This is in spite of at least a portion of the geographic feature 201e extending within the distance threshold 207.

In one embodiment, after identifying the proximate polygon points (e.g., polygon points 203a, 203c, and 203d), the system 100 retrieves the polygons corresponding to the proximate polygons points 203a, 203c, and 203d. For example, the polygons are those representing geographic features 203a, 203c, and 203d in the geographic database 101. The system 100 then determines whether there is overlap between the proximate polygons (e.g., the polygons corresponding to the proximate points 203a, 203c, and 203d) and the candidate point 205 using the traditional processes described above or any other process known in art for determining overlapping polygons. In this way, the system 100 applies the overlap analysis only on the determined proximate polygons and not all of the polygons of the geographic database 101.

In the example of FIG. 2, the resulting overlapping polygons are those polygons corresponding to geographic feature 201a (e.g., a geographic feature representing a neighborhood) and geographic feature 201c (e.g., a geographic feature representing a building). The system 100, for instance, can then provide location-based services based on the overlap such as providing POI recommendations, etc.

Returning to FIG. 1, as shown, the system 100 includes a mapping platform 103 configured to perform the functions associated with determining polygons that overlap with a candidate polygon or point according to the various embodiments described herein. In one embodiment, the mapping platform 103 is a server that provides mapping-related services, navigation-related services, and/or other location-based services using various embodiments of the process for determining overlapping polygons described herein. In addition, the mapping platform 103 has connectivity or access to the geographic database 101 which stores polygon representations of mapped geographic features. The geographic database 101 also stores polygon point representations (e.g., points with zero area) of the stored polygons for use by the mapping platform 103.

In one embodiment, the mapping platform 103 has connectivity over a communication network 109 to a services platform 105 that provides one or more services 107a-107n (also collectively referred to as services 107). By way of example, the services 107 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 107 use the output of the mapping platform 103 (e.g., polygons that overlap with a candidate polygon or point) to provide services such as POI recommendations, advertising intelligence, collating a new set of polygons with existing polygons, etc.

For example, a service 107 may use overlapping polygons to provide POI recommendations. In this example, the service 107 can provide a position of a user as a candidate point. In addition or alternatively, the service 107 can also associate an uncertainty radius or boundary with the candidate point. In one embodiment, the uncertainty radio or boundary can be represented by a candidate polygon (e.g., a polygon whose edges correspond to the uncertainty radius or boundary, and whose representative point corresponds to the user location). In one embodiment, the user location and/or location uncertainty can be sensed by a user equipment (UE) 111 (e.g., a smartphone or other mobile device) or user vehicle 113 equipped with one or more location sensors. In either case, the service 107 provides the candidate point or the candidate polygon (e.g., sensed from the UE 111 or vehicle 113) to the mapping platform 103 to find overlapping polygons (e.g., buildings or other geographic features). The service 107 can then make recommendations based on POIs corresponding to or within proximity of the geographic features associated with the determined overlapping polygons. The service 107 can then present the recommendations to the UE 111 (e.g., via an application 115 executing at the UE 111) and/or vehicle 113 (e.g., via an embedded system and/or application—not shown).

According to another example, a service 107 may provide advertising intelligence services. For example, it can be valuable to keep track of the preferences of users for places, things, experiences, etc. for presenting or determining responses to advertising content (or other presented content). Location-based services employing various embodiments of the processes for determining overlapping polygons as described herein can provide an automated way of determining such advertising intelligence data. In one embodiment, location traces of users can be sensed and recorded over time (e.g., throughout a user's typical daily activities) by the UE 111 and/or vehicle 113. The service can then determine candidate points and/or candidate polygons from the location traces, and feed the candidate points and/or candidate polygons to the mapping platform 103 to determine overlapping polygons according to the various embodiments described herein. Geographic features corresponding to the overlapping polygons (e.g., landmarks, buildings, POIs, etc.) can then be used to determine user preference information with respect to the types of places or geographic features visited by the user.

According to yet another example, a service 107 may be used for updating and/or collating new data that is to be stored in the geographic database 101. For example, when building footprint or polygon extraction algorithms (e.g., aerial/satellite photogrammetry, mobile LiDAR, etc.) detect new polygons, the service 107 can transmit the new polygons to the mapping platform 103 to determine overlaps with previously stored or detected polygons. Based on the overlapping polygons, the service 107 can determine whether the new polygons have been detected before or whether the new polygons are indeed new to the geographic database 101. In addition, the overlapping polygons can used to determine how to collate or sort the new polygons by determining their relationships with the overlapping polygons. For example, new polygons contained wholly within existing polygons may be associated with or otherwise share metadata with the containment polygon.

It is noted that the services 107 described above are provided by way of illustration and not limitation. It is contemplated that the services 107 may use the various embodiments described herein to find overlapping polygons to support any service function or action.

In one embodiment, the mapping platform 103 may be a platform with multiple interconnected components. The mapping platform 103 may include multiple servers, intelligent networking devices, computing devices, components and corresponding software for determining polygons that overlap with a candidate polygon or point. In addition, it is noted that the mapping platform 103 may be a separate entity of the system 100, a part of the one or more services 107, a part of the services platform 105, or included within the UE 111 and/or vehicle 113.

In one embodiment, the services platform 105 may include any type of service 107 configured to provide and/or use geographical data based on overlapping polygons determined by the mapping platform 103. By way of example, the services 107 may be first- or third-party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 105 may interact with the mapping platform 103, the UE 111, and/or the vehicle 113 to provide the services 107.

In one embodiment, content providers 117a-117m (collectively referred to as content providers 117) may provide content or data (e.g., including geographic data, geographic feature polygon data) to the geographic database 101, the mapping platform 103, the services platform 105, the services 107, the UE 111, the vehicle 113, and/or the application 115. The content provided may be any type of content, such as map content, textual content, audio content, video content, image content, etc. In one embodiment, the content providers 117 may provide content that may aid in the detecting and classifying of geographic features, polygons representing the geographic features, polygon points associated with the polygons, and/or the like. In one embodiment, the content providers 117 may also store content associated with the geographic database 101, mapping platform 103, services platform 105, services 107, UE 111, and/or vehicle 113. In another embodiment, the content providers 117 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the mapping platform 103.

In one embodiment, the UE 111 and/or vehicle 113 may execute a software application 115 to collect sensed location data for determining candidate points or polygons, and/or to present or use the overlapping polygon results generated by the mapping platform 103. By way of example, the application 115 may also be any type of application that is executable at the UE 111 and/or vehicle 113, such as mapping applications, location-based service applications, navigation applications, content provisioning services, camera/imaging application, media player applications, social networking applications, calendar applications, and/or the like. In one embodiment, the application 115 may act as a client for the mapping platform 103 and perform one or more functions of the mapping platform 103 alone or in combination with the platform 103.

By way of example, the UE 111 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 111 can support any type of interface to the user (such as "wearable" circuitry, etc.). In one embodiment, the UE 111 may be associated with the vehicle 113 or be a component part of the vehicle 113.

In one embodiment, the UE 111 and/or vehicle 113 are configured with various sensors for generating or collecting geographic data, candidate polygons, candidate points, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 111 and/or vehicle 113 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 111 and/or vehicle 113 may detect the relative distance of the vehicle from a lane or roadway, the presence of other vehicles, pedestrians, traffic lights, potholes and any other objects, or a combination thereof (e.g., LiDAR sensors, RADAR sensors, infrared sensors, etc.). In one scenario, the sensors may detect weather data, traffic information, or a combination thereof. In one embodiment, the UE 111 and/or vehicle 113 may include GPS or other satellite-based receivers to obtain geographic coordinates from satellites 119 for determining current location and time. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the geographic database 101, mapping platform 103, services platform 105, services 107, UE 111, vehicle 113, and/or content providers 117 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3A:
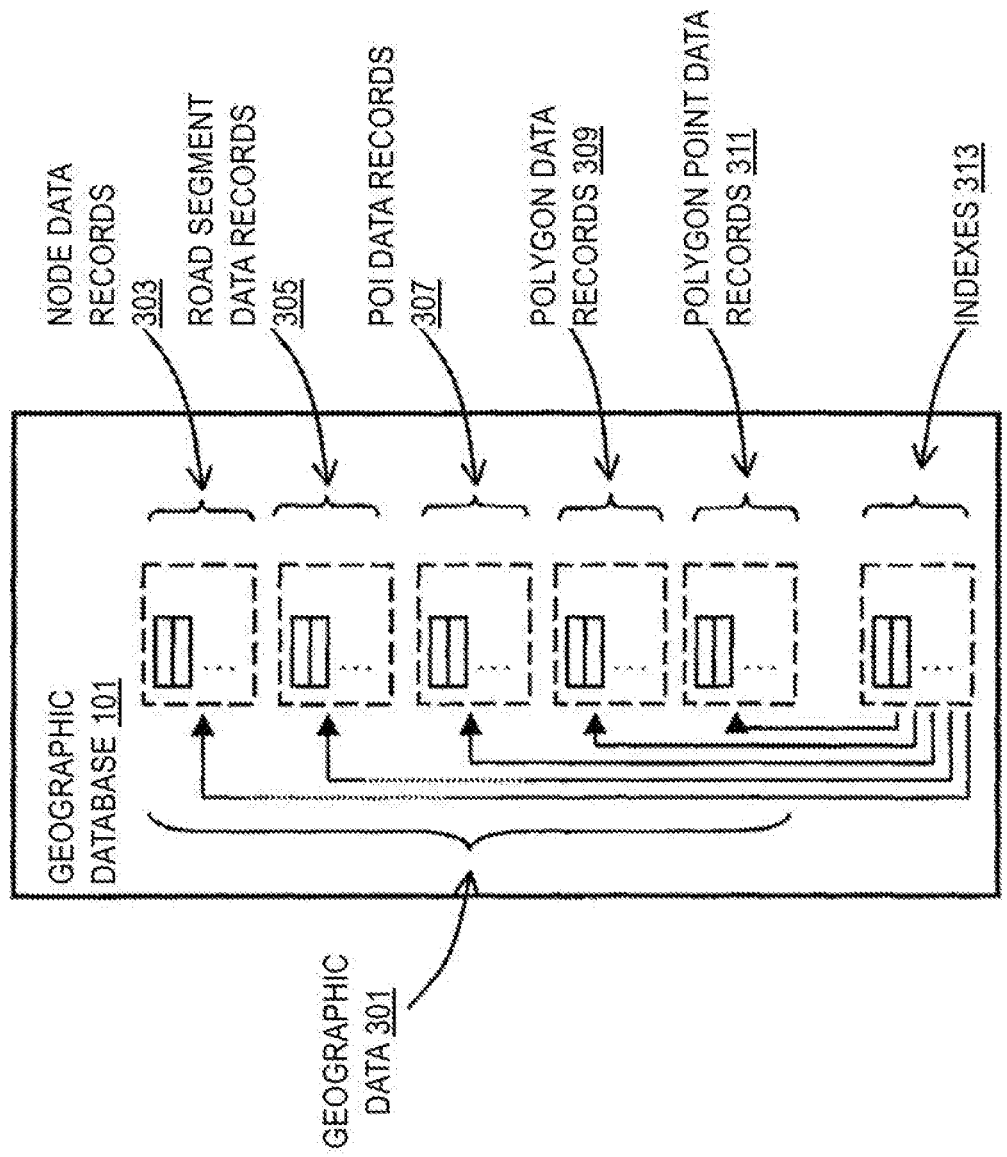
FIG. 3A is a diagram of a geographic database, according to one embodiment.

FIG. 3A is a diagram of a geographic database 101 of system 100, according to one embodiment. In one embodiment, the geographic database 101 includes geographic data 301 used for (or configured to be compiled to be used for) mapping and/or navigation-related services, such as for personalized route determination or to support the functions of the services platform 105 and/or services 107. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. Although various embodiments are discussed with respect to two-dimensional polygons, it is contemplated that the embodiments are also applicable to three dimensional polygon extrusions. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node.

In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown in FIG. 3A, the geographic database 101 includes node data records 303, road segment or link data records 305, POI data records 307, polygon data records 309, polygon point data records 311, and indexes 313, for example. More, fewer or different data records can be provided. In one embodiment, additional data records (not shown) can include cartographic ("carto") data records, routing data, and maneuver data. In one embodiment, the indexes 313 may improve the speed of data retrieval operations in the geographic database 101. In one embodiment, the indexes 313 may be used to quickly locate data without having to search every row in the geographic database 101 every time it is accessed. For example, in one embodiment, the indexes 313 can be a spatial index of the polygon points associated with stored feature polygons.

In exemplary embodiments, the road segment data records 305 are links or segments representing roads, streets, or paths, as can be used in the calculated route or recorded route information for determination of one or more personalized routes. The node data records 303 are end points corresponding to the respective links or segments of the road segment data records 305. The road link data records 305 and the node data records 303 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 307. The geographic database 101 can also include data about places, such as cities, towns, or other communities, and other geographic features, such as bodies of water, mountain ranges, etc. Such place or feature data can be part of the POI data records 307 or can be associated with POIs or POI data records 307 (such as a data point used for displaying or representing a position of a city).

In one embodiment, the geographic database 101 can also include polygon data records 309 for storing a data representation of the polygons representing the shape or boundaries of a mapped geographic features. In one embodiment, the polygon data records 309 can be associated with one or more of the POI data records 307 to indicate that the corresponding geographic feature contains or is otherwise associated with a given POI. In this way, the polygon data records 309 can also be associated with the characteristics or metadata of the corresponding POI data record 307 (e.g., POI type, characteristics, etc.). In addition, the geographic database 101 can also include polygon point data records 311 which are data representations of the respective zero area points of each stored polygon. As previously discussed, in one embodiment, the polygon points stored in the polygon point data records 311 can be calculated as the centroid of each polygon, or selected using any other means for determining a representative point of the polygon. Additional description of the polygon data records 309, the polygon point data records 311, and the spatial index 313 is provided below with respect to FIG. 3B.

In one embodiment, the geographic database 101 can be maintained by the content provider 117 in association with the services platform 105 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle (e.g., vehicle 113 and/or UE 111) along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 113 or UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 101 can be a master geographic database, but in alternate embodiments, the geographic database 101 can represent a compiled navigation database that can be used in or with end user devices (e.g., UE 111, vehicle 113, etc.) to provide navigation-related functions. For example, the geographic database 101 can be used with the end user device to provide an end user with navigation features. In such a case, the geographic database 101 can be downloaded or stored on the end user device (e.g., vehicle 113, UE 111, etc.), such as in application 115, or the end user device can access the geographic database 101 through a wireless or wired connection (such as via a server and/or the communication network 109), for example.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 111) can be a cellular telephone. An end user can use the device navigation functions such as guidance and map display, for example, and for determination of route information to at least one identified point of interest, receiving recommendations (e.g., POI recommendations), collating new polygon records, and/or performing a function of any of the services 107, according to exemplary embodiments.

Figure 3B:
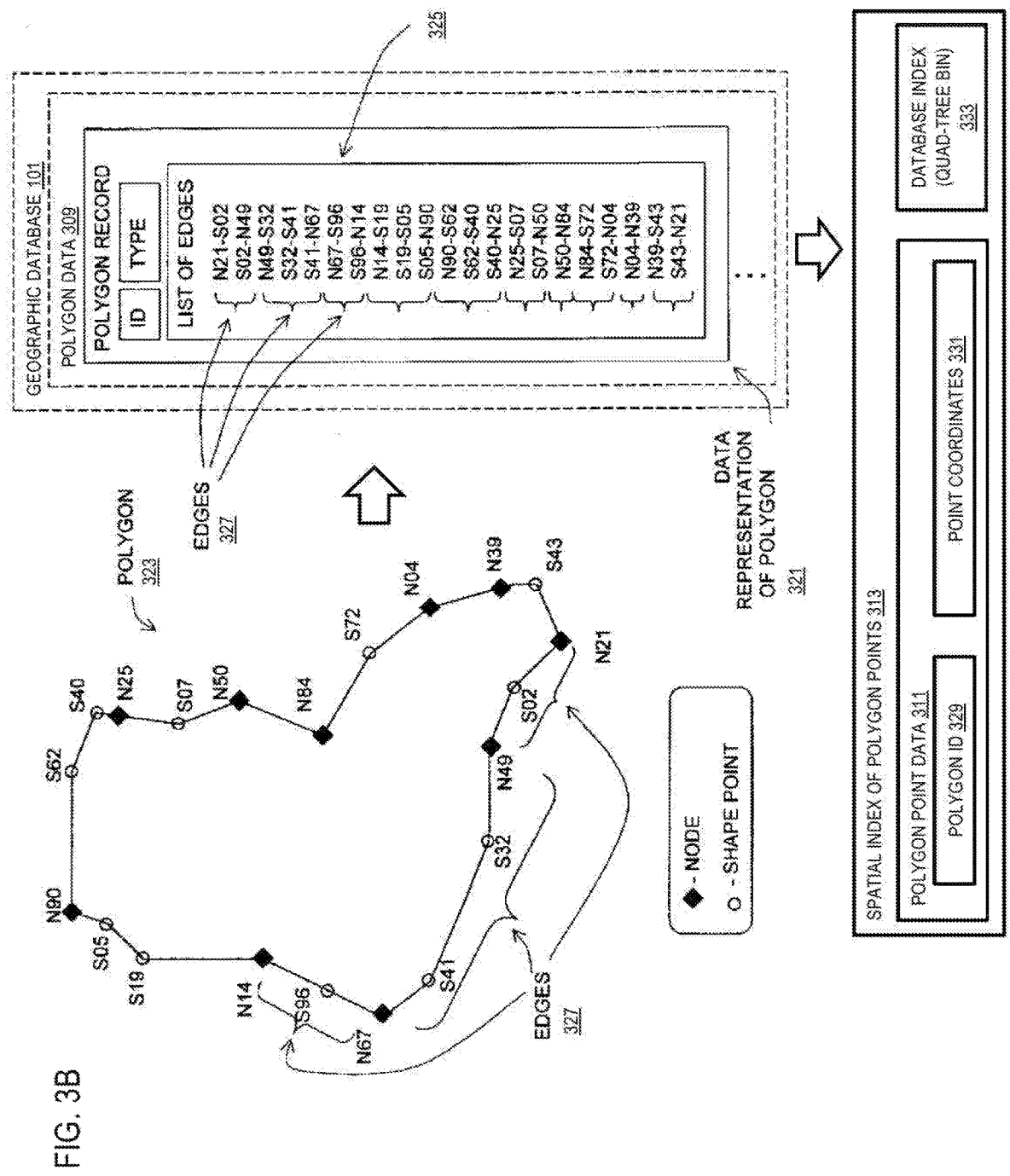
FIG. 3B is a diagram of a polygon data and spatial index stored in a geographic database, according to one embodiment.

FIG. 3B is a diagram of a polygon data and spatial index stored in a geographic database, according to one embodiment. In the geographic database 101 a data representation 321 of a polygon 323 that represents a geographic feature in a mapped geographic area includes a list 325. As shown, the list 325 is part of a polygon record stored in the polygon data records 309 of the geographic database 101. In one embodiment, the list 325 identifies each oriented link that forms the boundary of the polygon 323. For example, the edges 327 of the polygon 323 is represented in the list 325 as sequence of node and shape point segments. In one embodiment, according to one example convention used in the geographic database 101, the list 325 identifies the oriented links in a clockwise order. If the polygon 323 has a hole (e.g., a second polygon located entirely inside the first polygon), the hole polygon (not shown) is identified by a list of oriented links listed in counter clockwise order.

In one embodiment, the polygon 323 is associated with a polygon point data record 311 which is a data representation of a polygon point selected to represent the polygon 232. For example, the polygon point data record 311 can include a polygon ID 329 along with coordinates 331 (or other location identifier or index) identifying a location of the polygon point. In one embodiment, the point coordinates 331 can be used by the mapping platform 103 to determine points within a threshold distance of a candidate polygon or point using, for instance, a simple distance calculation between two points. In one embodiment, the geographic database 101 can include a spatial index 313 that correlates each polygon point data record 311 to a database index 333 (e.g., a quad-tree bin in which the point is located), as further described below.

FIG. 3C is a diagram of a quad-tree representation of a spatial index of polygon points, according to one embodiment. In one embodiment, the system 100 (e.g., via the mapping platform 103) stores the polygon points (e.g., representing the centroids of each stored polygon) as the spatial index 313 in the form of a quad-tree representation as shown in FIG. 3C. By way of example, the quad-tree representation 340 uses a hierarchical tile projection (e.g., the Mercator projection) that segments the world into, e.g., a quad-tree (or any other number of subdivisions) of any depth, which each depth representing a level of the hierarchical tile projection. In one embodiment, each level can be considered a "zoom level" because the map tiles at each zoom level represent a different geographic scale. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

For example, as shown, at level 341 of the quad-tree, the map tiles 343*a*-343*d* (also collectively referred to as tiles 343) are at a zoom level "X", and at a next level 345, the tiles 347*a*-347*b* (also collectively referred to as tiles 347) are at a lower level of zoom of "X−1". Accordingly, the geographic areas represented in the tiles 343*a*-343*d* of level 341 make up the tile 347a of level 345. In other words, the polygon points represented in all four of the tiles 343a-343d are included in the single tile 347a.

In one embodiment, the number of levels that are present in the quad-tree 340 is determined by the distance threshold 349 (e.g., distance radius) used to determine proximate polygon points. For example, the geographic scale at the highest level of zoom (e.g., level 341) is set so that the distance threshold 349 is at least entirely encompassed by a single tile (e.g., tile 343b). The number of levels is then dependent on the scale at the highest zoom level. For example, if the distance threshold is 1 km, the scale of at the highest zoom level can be set, for instance, to 2 km. At this initial scale, the depth of the projection is practically limited to 14 or less when using a 2 km by 2 km tile size that represents a 4 km$^2$ area. This is because a tile at the $14^{th}$ level would represent a $4^{14}$ km$^2$ area (approximately 268 million km$^2$), which surpasses the total area of the world (approximately 149 million km$^2$).

In one embodiment, the map tile grid may be numbered in a systematic fashion to define a tile identifier (tile ID) or bin number. For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Because of the numbering system, the exact position of any tile in any level of the map tile grid or projection may be uniquely determined from the tile ID or bin number.

In one embodiment, the system 100 may identify a tile by a quadkey determined based on the tile ID of a tile of the map tile grid. The quadkey, for example, is a one dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one dimensional array of the quadkey. In another example, the length of the one dimensional array of the quadkey may indicate the corresponding level within the map tile grid. In one embodiment, the quadkey is an example of the hash or encoding scheme of the respective geographical coordinates of a geographical data point that can be used to identify a tile in which the geographical data point is located. In one embodiment, the bin of the spatial index 313 can be identified by the quadkey.

In one embodiment, after creating the spatial index 313 that correlates polygon points to bins or tiles of the quad-tree representation 340, finding the proximate polygon points (and therefore the proximate polygons) is a matter of a search/collision with the right bin of the quad-tree 340 based on the distance threshold with respect to the candidate point or polygon. Once the proximate polygons are determined from the polygon points, the system 100 can use any process known in the art for determining overlapping polygons from among the proximate polygons with respect to the candidate point or polygon. Although two example process for determining overlaps are discussed above and further below, the two processes are discussed by way of illustration and not limitation.

Figure 4:
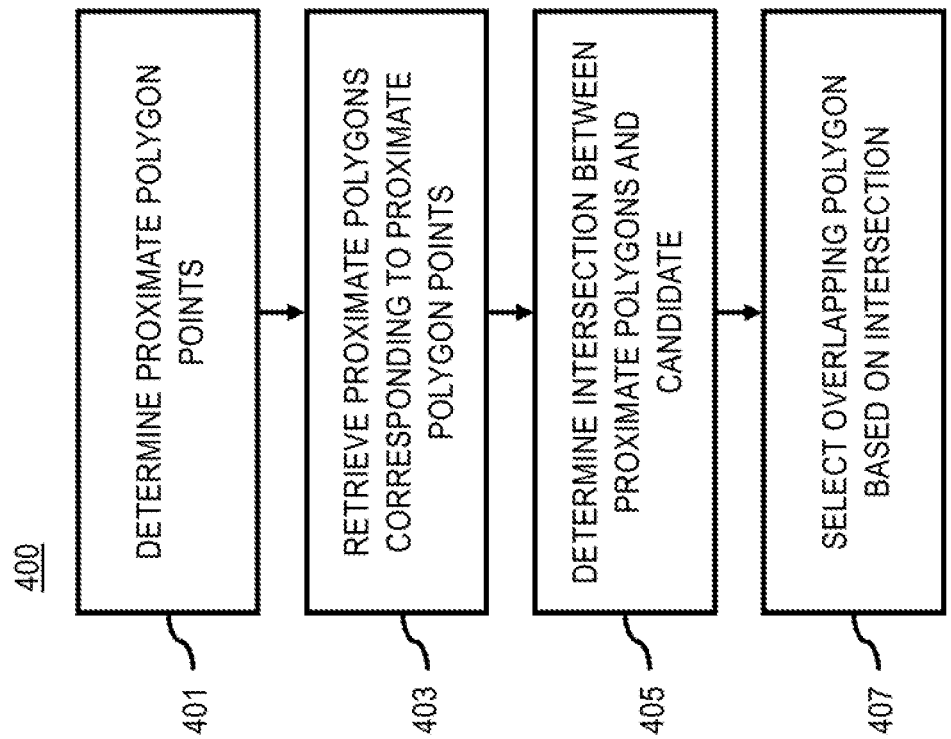
FIG. 4 is a flowchart of a process for using polygon point representations to find proximate polygons, according to one embodiment.
Figure 8:
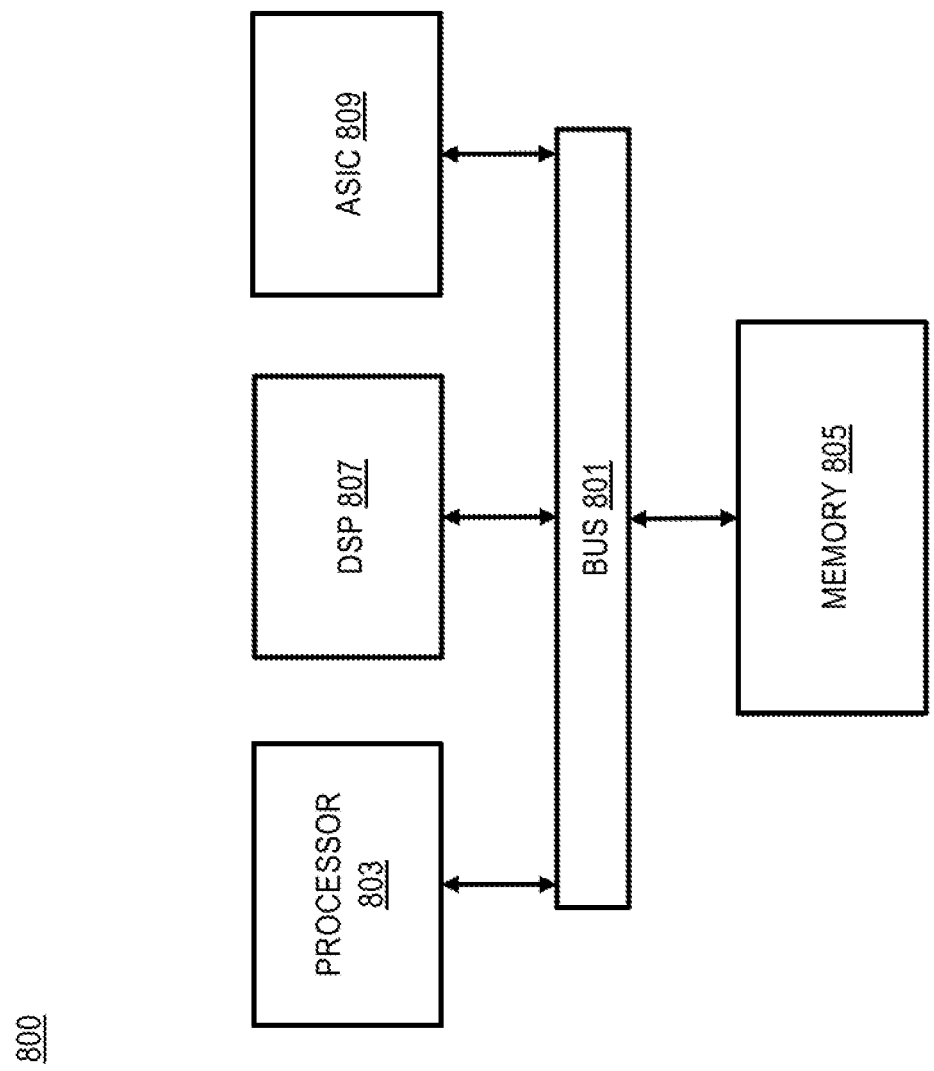
FIG. 8 is a diagram of a chip set that can be used to implement an embodiment of the invention.

FIG. 4 is a flowchart of a process for using polygon point representations to find proximate polygons, according to one embodiment. In one embodiment, the mapping platform 102 may perform one or more portions of the process 400 and may be implemented in, for instance, a chip set including a processor and a memory as shown in FIG. 8. As such, the mapping platform 103 can provide means for accomplishing various parts of the process 400. In addition or alternatively, the services platform 105 and/or services 107 may perform any combination of the steps of the process 400 in combination with the mapping platform 103 or as standalone components. Although the process 400 is illustrated and described as a sequence of steps, it is contemplated that various embodiments of the process 400 may be performed in any order or combination and need not include all of the illustrated steps.

In step 401, the mapping platform 103 determines one or more proximate polygon points from among polygon points with zero area stored in geographic database 101. In one embodiment, the proximate polygon points are those points that are within a distance threshold of a candidate polygon or the candidate point. As described above, in one embodiment, the geographic database 101 represents stored polygons as respective polygon points with zero area. In other words, the geographic database 101 uses points to represent a polygon in place of the entire area of the polygon. Because determining distances between points is less computationally intensive than determining distances between or areas of intersection between polygons, the computational burden is advantageously reduced with respect to processing resources and computation time.

In one embodiment, the respective polygon points are respective centroids of the stored polygons that are precomputed and stored in the geographic database 101. In addition or alternatively, the polygon points can be selected or computed at a time when a search for polygon points is conducted.

In one embodiment, the candidate polygon or candidate point is provided by a service 107 or user via an input to the mapping platform 103. In one embodiment, the input can be determined or collected from location sensors of a device (e.g., sensors of UE 111 and/or vehicle 113). In one embodiment, a candidate point can represent a determined or estimated location of a user. For example, the mapping platform 103 processes location data to determine a candidate polygon. In yet another embodiment, a candidate polygon can represent an area of location uncertainty surrounding of a location (e.g., the candidate point) determined from a location sensor of a device. For example, the location of accuracy of a location sensor (e.g., GPS sensor) can be reported or measured by the respective sensor and transmitted to the mapping platform 103. The mapping platform then constructs a candidate polygon based on the determined candidate location and the reported location uncertainty.

In one embodiment, the candidate polygons can be new polygons mapped or determined for a geographic area. For example, as described above, automated mapping and extraction of polygons using techniques such as aerial/satellite photogrammetry, mobile LiDAR, and/or other mapping techniques known in the art can result in candidate polygons. In other words, the candidate polygon represents a geographic area or geographic feature, and the location data from which the geographic feature is extracted is determined from a location sensor of a device.

In one embodiment, if a candidate polygon is being processed, a candidate point can be selected from the candidate polygon (e.g., as a centroid of the candidate polygon) to facilitate processing. Alternatively, the mapping platform 103 can apply the distance threshold directly to the polygon (e.g., by applying the threshold distance from the boundary of the candidate polygon instead of a representative point within the polygon).

In one embodiment, the polygons can be two-dimensional or three-dimensional polygons. For example, when operating on two-dimensional polygons, the mapping platform 103 can determine proximate polygons with respect to two axes (e.g., X and Y). When operating on three-dimensional polygons or polygon extrusions, the mapping platform 103 can determine proximate polygons with respect to three axes (e.g., X, Y, and Z). In addition or alternatively, when operating on three-dimensional polygons, the mapping platform 103 can project the three-dimensional polygons onto a two-dimensional plane to generate a two-dimensional polygon representing a projected footprint of the three-dimensional polygon or geographic feature.

In one embodiment, the mapping platform 103 determines the distance threshold for finding proximate polygon points as a fixed radius from a candidate point or polygon. In addition or alternatively, the mapping platform 103 can apply a dynamic distance threshold. For example, the mapping platform 103 can determine the dynamic distance threshold based on the anticipated size of the geographic features of interest that are to be processed for overlapping polygons. In one example use case, when finding overlaps of polygons that represent buildings, a distance threshold of 1 km may be sufficient because a building is typically smaller than 1 km. However, when finding overlaps of polygons that represent parks, neighborhoods, cities, etc., the distance threshold can potentially be expanded to 10-100 km. Accordingly, in one embodiment, the mapping platform 103 determines a geographic feature associated with the candidate polygon, the candidate point, the one or more proximate polygons, the one or more proximate polygon points, or a combination thereof. The mapping platform 103 then determines the distance threshold based on the geographic feature or characteristics of the geographic feature.

In addition, although the distance threshold is described as radius from a candidate point or point, and therefore forms a circular threshold area, it is contemplated that the mapping platform 103 can use any shape or distance (regular or irregular) to define a distance threshold. For example, the mapping platform 103 can specify another polygon as a distance threshold, so that the boundaries of the polygon define the boundaries of the threshold area for determining proximate polygon points. The polygon can be drawn or specified by a user or even selected from one of the stored polygons of the geographic database 101. For example, a distance threshold corresponding to a particular neighborhood can be selected if that neighborhood is represented in the geographic database 101 as a polygon.

In step 403, the mapping platform 103 retrieves one or more proximate polygons from the geographic database that correspond to the one or more proximate polygon points. By way of example, the mapping platform 103 can determine a polygon ID or other identifier associated with the proximate polygon point, and then retrieve the one or more proximate polygons from the geographic database. The proximate polygons, for instance, can retrieved as a data representation of the polygon as described with respect to FIG. 3B above.

In step 405, the mapping platform 103 determines an intersection between the one or more proximate polygons and the candidate polygon or the candidate point. As previously discussed, finding the intersection or overlap between the proximate polygons can be performed using any method (see FIG. 5 for examples). No matter which method is used, the embodiments described herein results in reduced computational resources and time because only a subset of polygons (e.g., the proximate polygons) are processed to determine overlaps.

In step 407, the mapping platform 103 selects the polygon that overlaps the candidate polygon or the candidate point based on the determined intersection. In one embodiment, the polygon that overlaps is a building polygon overlapping or containing the candidate polygon or the candidate point.

As previously described, the mapping platform 103 can use the determined overlapping polygons to provide any number of services. For example, if the candidate polygon is a new polygon, the mapping platform 103 collates the candidate polygon into the geographic database based on the selected polygon that overlaps.

In one embodiment, the mapping platform 103 presents the selected polygon that overlaps as a recommended point-of-interest in a recommendation user interface.

In another embodiment, when the candidate polygon or candidate point represents a user location trace, the mapping platform 103 identifies points of interest associated with the user location trace based on the selected polygon that overlaps. The mapping platform 103 can then use the identified points of interest to calculate or estimate user preferences (e.g., with respect to advertising intelligence as described above).

Figure 5:
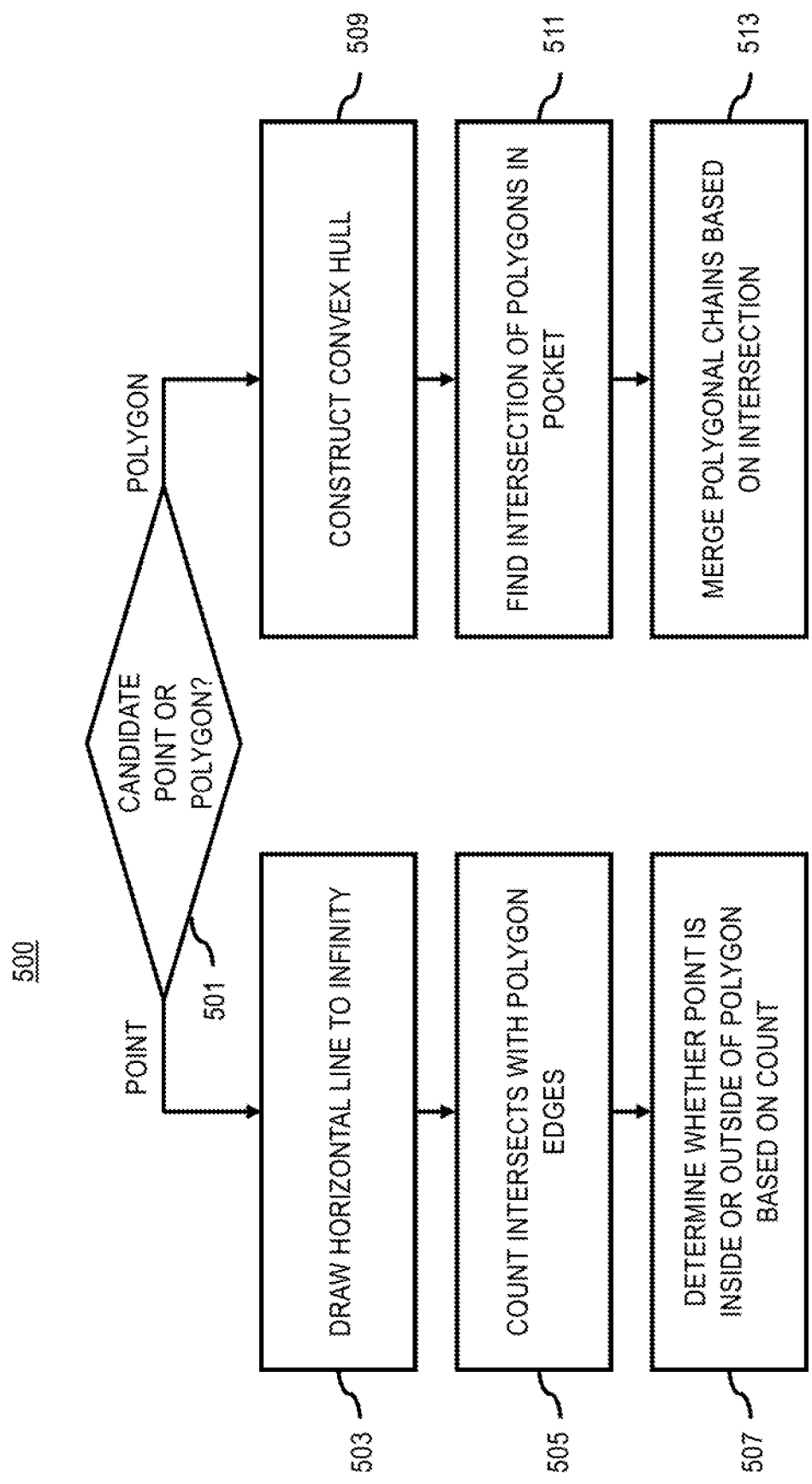
FIG. 5 is a flowchart of a process for finding overlapping polygons from among proximate polygons, according to one embodiment.

FIG. 5 is a flowchart of a process for finding overlapping polygons from among proximate polygons, according to one embodiment. In one embodiment, the mapping platform 102 may perform one or more portions of the process 500 and may be implemented in, for instance, a chip set including a processor and a memory as shown in FIG. 8. As such, the mapping platform 103 can provide means for accomplishing various parts of the process 500. In addition or alternatively, the services platform 105 and/or services 107 may perform any combination of the steps of the process 500 in combination with the mapping platform 103 or as standalone components. Although the process 500 is illustrated and described as a sequence of steps, it is contemplated that various embodiments of the process 500 may be performed in any order or combination and need not include all of the illustrated steps.

In one embodiment, the process 500 of FIG. 5 is performed following identification of proximate polygons as described with respect to the process 400 of FIG. 4.

In step 501, the mapping platform 103 determines whether the system 100 is determining an overlap of a candidate point or of a candidate polygon. If the mapping platform 103 is processing a candidate point for overlap with the identified proximate polygons, the mapping platform 103 extends or draws a horizontal line from the candidate point to infinity (step 503). In one embodiment, infinity refers to a distance beyond the furthest extent of a geographic area represented by any of the proximate polygons.

In step 505, the mapping platform 103 counts a number of times the horizontal line intersects with an edge of at least one of the one or more proximate polygons.

In step 507, the mapping platform 103 determines that the candidate point intersects or overlaps with at least one of the one or more proximate polygons if the candidate point falls within a proximate polygon when the number of times that the line intersects is odd or if the candidate point lies on the edge of a proximate polygon.

If the mapping platform 103 is processing a candidate polygon, the mapping platform 103 constructs a convex hull of a union of the candidate polygon and at least one of the one or more proximate polygons (step 509).

In step 511, the mapping platform 103 determines a pocket lid of the convex hull. In one embodiment, the pocket lid is a line segment belonging to the convex hull of the union of the two polygons, but which belongs to neither the candidate polygon nor the proximate polygon. Generally, there are at least two pocket lids for each convex hull. However, this does not hold when one polygon is completely contained within another polygon. In this case, the convex hull is co-incident with the containing polygon.

In step 513, the mapping platform 103 determines the intersection as respective portions of the candidate polygon and the at least one of the one or more proximate polygons that lie within a pocket delineated by the determined pocket lid(s). If the intersection is empty, then there is no intersection between the candidate polygon and the proximate polygon.

Figure 6:
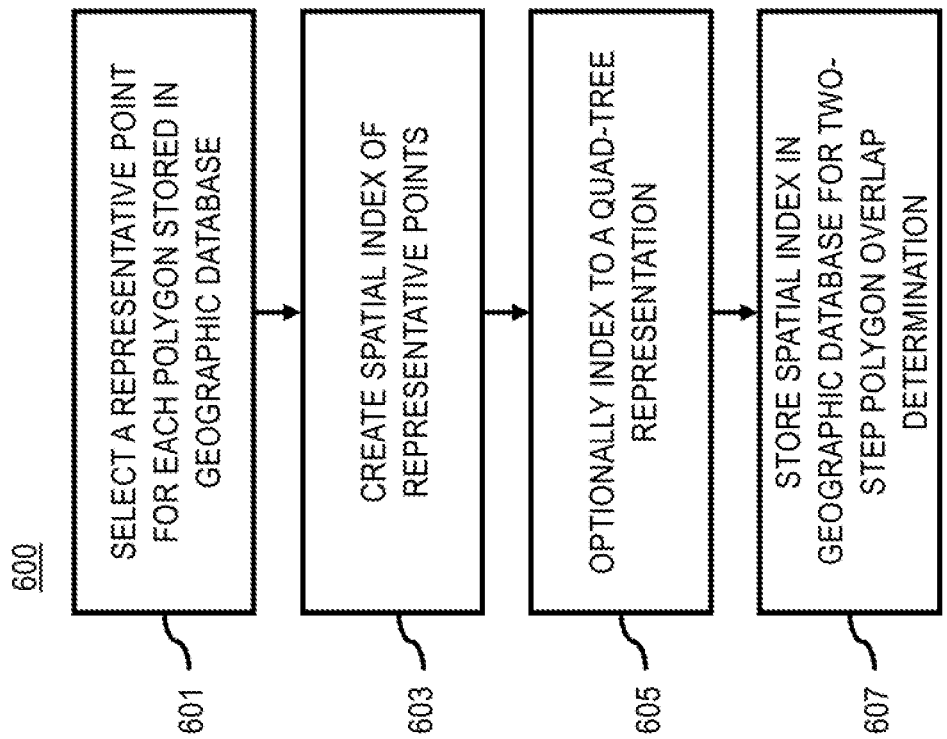
FIG. 6 is a flowchart of a process for creating a spatial index of polygon points, according to one embodiment.

FIG. 6 is a flowchart of a process for creating a spatial index of polygon points, according to one embodiment. In one embodiment, the mapping platform 102 may perform one or more portions of the process 600 and may be implemented in, for instance, a chip set including a processor and a memory as shown in FIG. 8. As such, the mapping platform 103 can provide means for accomplishing various parts of the process 600. In addition or alternatively, the services platform 105 and/or services 107 may perform any combination of the steps of the process 600 in combination with the mapping platform 103 or as standalone components. Although the process 600 is illustrated and described as a sequence of steps, it is contemplated that various embodiments of the process 600 may be performed in any order or combination and need not include all of the illustrated steps.

In step 601, the mapping platform 103 selects a respective point of each polygon stored in the geographic database, wherein the respective point is a zero area of said each polygon. As previously described, in one embodiment, the respective point is a selected as the centroid of each polygon. However, it is contemplated that any other criteria, rule, algorithm, or process can be used to select a representative point for each polygon. In other words, any point can be selected from each polygon, and the point need not be the centroid.

In step 603, the mapping platform 103 creates a spatial index of said each polygon using the respective point. In one embodiment, the spatial index correlates at least the polygon point with its respective polygon. For example, the index may link an identifier of the polygon point with an identifier of the corresponding polygon. In one embodiment, the identifier of the polygon point can be uniquely identified as a location coordinate itself (e.g., latitude, longitude, and optionally altitude).

In step 605, the mapping platform 103 optionally creates the spatial index as a quad-tree representation. By way of example, the quad-tree representation represents a Mercator or tile-based projection of the polygon points into a data representation for discrete areas of a mapped geographic area as described above with respect to FIG. 3C. In one embodiment, the mapping platform 103 determines a number of levels in the quad-tree representation based on the distance threshold. As previously described, the different levels of the quad-tree representation correspond to map tiles or bins scaled at different levels of zoom or areas of coverage. The geographic scale of a tile can be based on the distance threshold applied for determining proximate points. For example, the scale can set to so that each tile can fully encompass the threshold area defined by the threshold distance.

In step 607, the mapping platform 103 stores the spatial index in the geographic database. In one embodiment, the spatial index is then used to support the process 400 of FIG. 4. For example, the spatial index is searched to determine one or more proximate points from among the indexed respective points that are within a distance threshold of the candidate polygon or the candidate point. In one embodiment, the searched spatial index returns a bin of the quad-tree containing the one or more proximate points. As described above, the one or more proximate polygons corresponding to the one or more proximate points are retrieved from the geographic database to determine the polygon that overlaps the candidate polygon or the candidate point.

The processes described herein for determining polygons that overlap with a candidate polygon or point may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
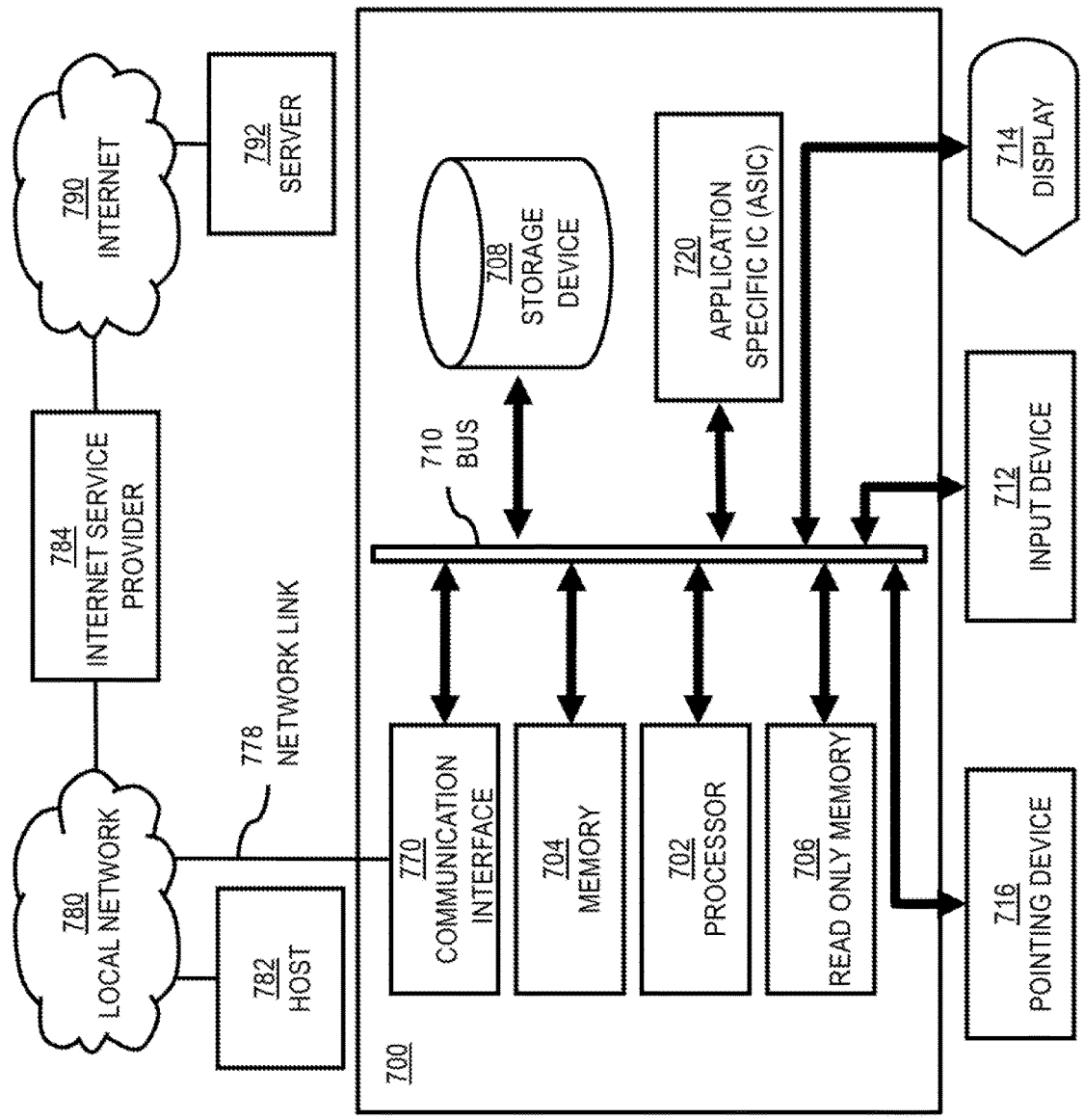
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to determine polygons that overlap with a candidate polygon or point as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to determining polygons that overlap with a candidate polygon or point. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for determining polygons that overlap with a candidate polygon or point. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for determining polygons that overlap with a candidate polygon or point, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 109 for determining polygons that overlap with a candidate polygon or point.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to determine polygons that overlap with a candidate polygon or point as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to determine polygons that overlap with a candidate polygon or point. The memory 805 also stores the data associated with or generated by the execution of the inventive steps.

Figure 9:
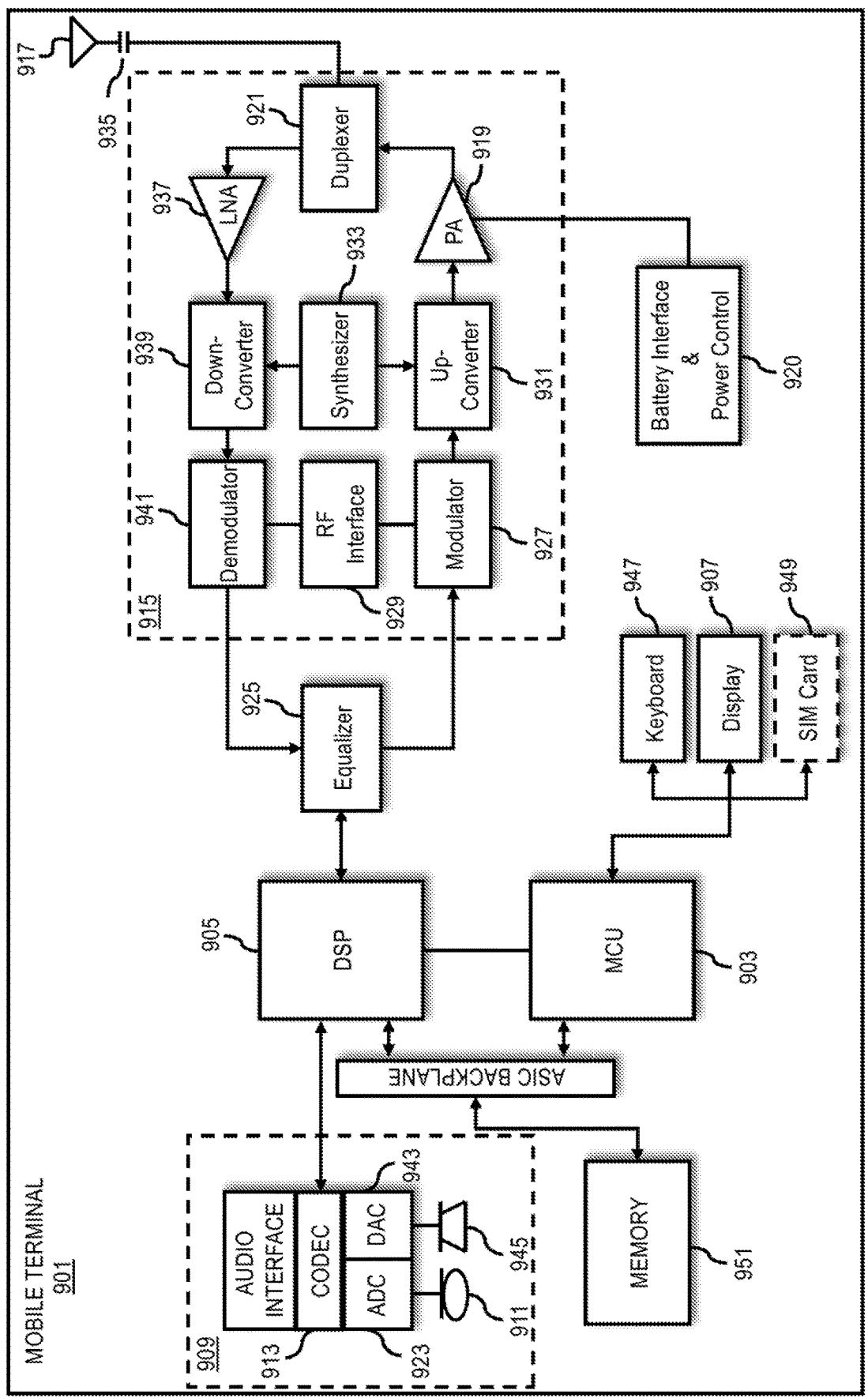
FIG. 9 is a diagram of a mobile terminal (e.g., handset) that can be used to implement an embodiment of the invention.

FIG. 9 is a diagram of exemplary components of a mobile station (e.g., the UE 111) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to determine polygons that overlap with a candidate polygon or point. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium for determining a polygon of a geographic database that overlaps a candidate polygon or a candidate point, carrying one or more sequences of one or more instructions which, when executed by one or more processors, cause an apparatus to perform:
    selecting a respective point of each polygon stored in the geographic database, wherein the respective point is a zero area of said each polygon;
    creating a spatial index of said each polygon using the respective point;
    storing the spatial index in the geographic database;
    receiving a request for a point-of-interest (POI) recommendation from a user device located at the candidate point;
    searching the spatial index to determine one or more proximate points from among the indexed respective points that are within a distance threshold of the candidate polygon or the candidate point;
    retrieving one or more proximate polygons corresponding to the one or more proximate points from the geographic database to determine the polygon that overlaps the candidate polygon or the candidate point; and
    providing a POI recommendation to the user device based in part on the polygon that overlaps the candidate polygon or the candidate point.

2. The non-transitory computer-readable storage medium of claim 1, wherein the apparatus is further caused to perform:
    creating the spatial index as a quad-tree representation.

3. The non-transitory computer-readable storage medium of claim 2, wherein the apparatus is further caused to perform:
    determining a number of levels in the quad-tree representation based on the distance threshold.

4. The non-transitory computer-readable storage medium of claim 2, wherein the searched spatial index returns a bin of the quad-tree containing the one or more proximate points.

5. The non-transitory computer-readable storage medium of claim 1, wherein the one or more proximate polygons are a subset of less than all of a plurality of polygons stored in the geographic database.

6. The non-transitory computer-readable storage medium of claim 1, wherein the distance threshold is a radius from a center point of the candidate polygon or the candidate point.

7. The non-transitory computer-readable storage medium of claim 1, wherein:
    the candidate polygon represents an area of location uncertainty corresponding to a location determined from a location sensor of a device, and
    the location of accuracy of the location sensor can be determined by the location sensor and transmitted to the geographic database.

8. A method for determining a polygon of a geographic database that overlaps a candidate polygon or a candidate point, the method comprising:
    selecting a respective point of each polygon stored in the geographic database, wherein the respective point is a zero area of said each polygon;
    creating a spatial index of said each polygon using the respective point;
    storing the spatial index in the geographic database;
    receiving a request for a point-of-interest (POI) recommendation from a user device located at the candidate point;
    searching the spatial index to determine one or more proximate points from among the indexed respective points that are within a distance threshold of the candidate polygon or the candidate point;
    retrieving one or more proximate polygons corresponding to the one or more proximate points from the geographic database to determine the polygon that overlaps the candidate polygon or the candidate point; and
    providing a POI recommendation to the user device based in part on the polygon that overlaps the candidate polygon or the candidate point.

9. The method of claim 8, further comprising:
    creating the spatial index as a quad-tree representation.

10. The method of claim 9, further comprising:
    determining a number of levels in the quad-tree representation based on the distance threshold.

11. The method of claim 9, wherein the searched spatial index returns a bin of the quad-tree containing the one or more proximate points.

12. The method of claim 8, wherein the one or more proximate polygons are a subset of less than all of a plurality of polygons stored in the geographic database.

13. The method of claim 8, wherein the distance threshold is a radius from a center point of the candidate polygon or the candidate point.

14. An apparatus for determining a polygon of a geographic database that overlaps a candidate polygon or a candidate point, the apparatus comprising:

at least one processor; and at least one memory including computer program code for one or more programs, the at least one memory and the computer program code configured to, with the at least one processor, cause the apparatus to perform at least the following, select a respective point of each polygon stored in the geographic database, wherein the respective point is a zero area of said each polygon;

create a spatial index of said each polygon using the respective point;

store the spatial index in the geographic database;

receive a request for a point-of-interest (POI) recommendation from a user device located at the candidate point;

search the spatial index to determine one or more proximate points from among the indexed respective points that are within a distance threshold of the candidate polygon or the candidate point;

retrieve one or more proximate polygons corresponding to the one or more proximate points from the geographic database to determine the polygon that overlaps the candidate polygon or the candidate point; and provide a POI recommendation to the user device based in part on the polygon that overlaps the candidate polygon or the candidate point.

15. The apparatus of claim 14, further comprising:
create the spatial index as a quad-tree representation.

16. The apparatus of claim 15, further comprising:
determine a number of levels in the quad-tree representation based on the distance threshold.

17. The apparatus of claim 15, wherein the searched spatial index returns a bin of the quad-tree containing the one or more proximate points.

18. The apparatus of claim 14, wherein the one or more proximate polygons are a subset of less than all of a plurality of polygons stored in the geographic database.

19. The apparatus of claim 14, wherein the distance threshold is a radius from a center point of the candidate polygon or the candidate point.

* * * * *